Figure 1:
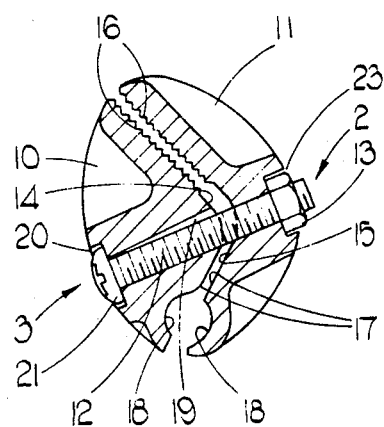

United States Patent [19]

Guggiari

[11] Patent Number: 4,595,163
[45] Date of Patent: Jun. 17, 1986

[54] MOUNTING BRACKET FOR SECURING A LAMP TO A MOTOR VEHICLE

[75] Inventor: Roy S. Guggiari, Solihull, England

[73] Assignee: Butlers Ltd., Birmingham, England

[21] Appl. No.: 101,199

[22] Filed: Dec. 7, 1979

Related U.S. Application Data

[63] Continuation of Ser. No. 598,815, Jul. 24, 1975, abandoned.

[30] Foreign Application Priority Data

Aug. 1, 1974 [GB] United Kingdom ............... 33940/74

[51] Int. Cl.[4] ............................................. A47B 96/06
[52] U.S. Cl. ................................... 248/229; 248/316.4
[58] Field of Search ............ 248/228, 229, 230, 225.4,
248/226.3, 316 C; 24/243 B, 243 K, 263 A;
362/78, 82, 396; 160/DIG. 3, 399, 402; 403/385

[56] References Cited

U.S. PATENT DOCUMENTS

| 1,577,937 | 3/1926 | Slusser | 362/82 |
| 2,569,068 | 9/1951 | Maxwell | 248/229 X |
| 2,731,935 | 1/1956 | Aves | 248/229 X |
| 3,843,083 | 10/1974 | Angibaud | 248/229 |

FOREIGN PATENT DOCUMENTS 822126 11/1951 Fed. Rep. of Germany ... 339/263 R

Primary Examiner—J. Franklin Foss
Attorney, Agent, or Firm—Murray Schaffer

[57] ABSTRACT

A mounting bracket for securing a lamp to a motor vehicle comprises a pair of body parts defining therebetween a first set of substantially planar, bumper-engaging serrated jaws and a second set of jaws inclined with respect to the first set. Each jaw of the second set has a transverse recess to accommodate a mounting bar on the lamp. A screw clamp holds the two body parts together and passes with clearance through a bore in one of the body parts.

5 Claims, 4 Drawing Figures

MOUNTING BRACKET FOR SECURING A LAMP TO A MOTOR VEHICLE

This is a continuation application Ser. No. 598,815, filed July 24, 1975 now abandoned.

This invention relates to a mounting bracket for securing a lamp to a motor vehicle.

According to the present invention, there is provided a mounting bracket for securing a lamp to a motor vehicle, said bracket comprising two body parts having mutually opposed surfaces defining first and second sets of clamping jaws, and clamping means extending between the body parts, said clamping means being arranged, when operated, to bring together the jaws in the respective sets.

Conveniently, the clamping means includes a screw having a head engaged against one of the body parts, and fixed screw threading in the other body part with which a screw threaded portion on the screw is engaged.

The fixed screw threading is preferably provided in a nut disposed in a recess in the said other body part and fixed against rotation relative thereto.

Preferably, the mutually opposed surfaces are non-planar so that the first set of clamping jaws is inclined with respect to the second set.

Preferably, the screw is disposed with clearance in a bore in said one of the body parts so that clamping of one set of jaws can continue even when the other set is engaged against a part being clamped thereby.

The jaws of the first set may be substantially planar and are preferably serrated.

Each jaw of the second set of jaws preferably has a transverse recess therein so as to accommodate a mounting bar on the lamp.

Also according to the present invention, there is provided a motor vehicle lamp having a mounting bar, and a mounting bracket as defined in any one of the last preceding seven paragraphs, the bar on the lamp being disposed between the second set of clamping jaws.

Figure 2:
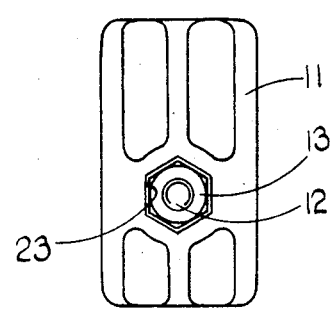
Figure 3:
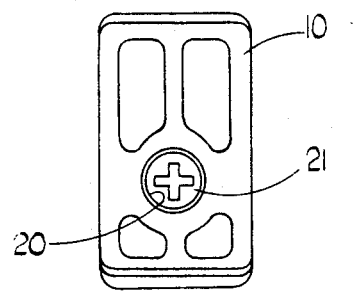
Figure 4:
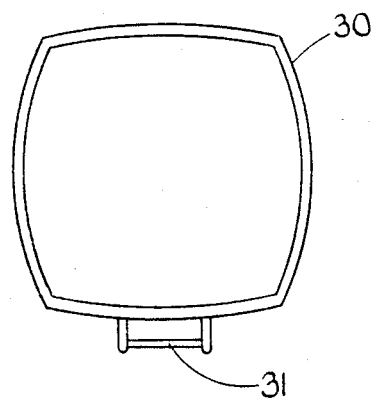

An embodiment of the present invention will now be described, by way of example, with reference to the accompanying drawing in which:

FIG. 1 is a longitudinal sectional view of a mounting bracket according to the present invention for securing a lamp to a motor vehicle, FIG. 2 is a view in the direction of arrow 2 of the mounting bracket of FIG. 1, FIG. 3 is a view in the direction of arrow 3 of the mounting bracket of FIG. 1, and FIG. 4 is a front elevation of a motor vehicle lamp for use with the mounting bracket of FIGS. 1 to 3.

Referring to FIGS. 1 to 3, the mounting bracket comprises two body parts 10 and 11, and clamping means in the form of a screw 12 and nut 13 extending between the two parts 10 and 11.

Each part 10, 11 is formed of polypropylene filled with 25% by weight of glass reinforcement. The parts 10 and 11 have mutually opposed surfaces 14, 15 respectively which are of non-planar shape. The surfaces 14 and 15 together define a first set of clamping jaws 16 and a second set of clamping jaws 17, the first and second sets of clamping jaw 16 and 17 being disposed at opposite ends of the body parts 10 and 11. Each jaw 16 is substantially planar and is serrated, whereas each jaw 17 is provided with a transverse recess 18, the two recesses 18 lying opposite one another so as to define a bore of substantially circular cross section. Opening onto surface 14 between the respective jaws 16 and 17 is a bore 19 which tapers inwardly away from surface 14 to communicate with a recess 20 of circular cross-section. The screw 12 is disposed in the bore 19 with a head 21 of the screw engaging in recess 20. The screw 12 projects through the bore 19 and into a bore 22 formed in body part 11. The bore 22 is in substantial alignment with bore 19, but there is less clearance between the screw 12 and bore 22 than there is between screw 12 and bore 19 in the region of the latter adjacent surface 14. The screw 12 projects beyond part 11 and engages internal screw threading in nut 13 which is engaged in a non-circular recess 23 formed in body part 11. The nut 13 is held against rotation relative to body part 11 because of the shape of the recess 23.

The above described mounting bracket is intended to be used with a motor vehicle lamp illustrated in FIG. 4 which comprises a body 30 including the usual reflector and lamp filament, and a mounting bar 31 secured to the underside of the body 30 in spaced relationship thereto. In order to mount the lamp illustrated in FIG. 4 on a motor vehicle, the screw 12 is slackened sufficiently to enable the bar 31 to be engaged in the recesses 18 defined in the second set of clamping jaws 17. The assembly of bracket and lamp is then engaged with a front or rear bumper (not shown) of a motor vehicle, so that a longitudinal edge of the bumper is passed between the first set of clamping jaws 16. When the screw 12 is tightened, the first and second sets of clamping jaws 16 and 17 are brought together so as to clamp the first set of clamping jaws 16 firmly to the bumper, and the second set of clamping jaws 17 firmly to the bar 31. Before the adjusting screw 21 is fully tightened, the lamp can be adjusted in the vertical plane by pivoting it about the axis of bar 31 so that the bar 31 moves axially in recesses 18 and relative to clamping jaws 17. When the desired adjustment of the lamp has been effected, the adjusting screw 21 is finally tightened. The clearance between the adjusting screw 12 and the bore 19 adjacent surface 14 is provided to enable the mounting bracket to be used with bumpers of varying thicknesses. It will be appreciated that, even when the clamping jaws 16 have closed against the bumper, and the second set of clamping jaws 17 have not completely closed on bar 31, longitudinal tilting movement of body part 10 relative to body part 11, as permitted by the clearance in bore 19, permits the second set of clamping jaws 17 to be closed upon further rotation of screw 12.

The above described arrangement provides an extremely secure mounting for a motor vehicle lamp. This is very important where it is obviously desirable to mount a lamp as firmly as possible to prevent vibration thereof in use. A further advantage of the above described mounting bracket is that damage to the surfaces of the bumper and to the surface of the bar on the lamp is minimised, thereby minimising the risk of rusting or other corrosion.

I claim:

1. A mounting bracket for securing a lamp to a motor vehicle comprising, first and second rigid body parts, each of said body parts having a central boss of non-planar shape having mutually opposed mating surfaces, and a bore extending through each of said bosses in general alignment, screw means extending through said bores to join said body parts together, each of said body parts having lateral extensions mutually opposed to each other defining therebetween a first and a second set of clamping jaws formed respectively by first and second substantially parallel surfaces, said second set of clamping jaws being transversely recessed to accomodate a mounting bar on the lamp, said first and second sets of jaws being mutually inclined and disposed on opposite sides of said bores, the bore of said first body part being tapered from a narrow diameter at the exterior surface to a wider diameter at the interior surface of the first body part in opposition to the second body part, said screw being rotatably mounted with clearance in at least the tapered bore of said first body part, said screw and said bores in said body parts being formed such that there is less clearance between said screw and said bore in said second body part than that between said screw and said bore in said first body part, said screw and bore cooperating to permit tilting of the interior surface of the first body part with respect to the interior surface of the second body part on introduction of the mounting bar.

2. The mounting bracket according to claim 1, wherein the jaws of said first set of clamping jaws are serrated.

3. The mounting bracket according to claim 1, wherein said screw means includes a nut disposed in a recess formed in said second body part aligned with the bore therein.

4. The mounting bracket according to claim 3, wherein said nut is fixed against rotation in said recess.

5. The mounting bracket according to claim 1, wherein said first and second body parts are formed of glass reinforced polypropylene.

* * * * *